US011990025B2

(12) United States Patent
Stewart

(10) Patent No.: US 11,990,025 B2
(45) Date of Patent: May 21, 2024

(54) METHOD AND SYSTEM FOR PROBABILISTIC NETWORK BASED LOSS PREVENTION SENSORS

(71) Applicant: Sensormatic Electronics, LLC

(72) Inventor: Michael C. Stewart, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 410 days.

(21) Appl. No.: 17/497,729

(22) Filed: Oct. 8, 2021

(65) Prior Publication Data

US 2022/0114881 A1 Apr. 14, 2022

Related U.S. Application Data

(60) Provisional application No. 63/089,948, filed on Oct. 9, 2020.

(51) Int. Cl.
*G08B 31/00* (2006.01)
*G08B 13/22* (2006.01)

(52) U.S. Cl.
CPC ............ *G08B 31/00* (2013.01); *G08B 13/22* (2013.01)

(58) Field of Classification Search
CPC .... G08B 31/00; G08B 13/22; G08B 13/2482; G08B 29/186; G08B 29/188
See application file for complete search history.

(56) References Cited

U.S. PATENT DOCUMENTS

2009/0174544 A1* 7/2009 Allen .................... G08B 29/26 340/10.3
2021/0097826 A1* 4/2021 Trivelpiece .......... H04B 17/318
2021/0110689 A1* 4/2021 Allen ................ G08B 13/1436

FOREIGN PATENT DOCUMENTS

WO WO-2016024222 A1 * 2/2016 ......... G07C 9/00111

* cited by examiner

*Primary Examiner* — Quan Zhen Wang
*Assistant Examiner* — Rajsheed O Black-Childress
(74) *Attorney, Agent, or Firm* — ArentFox Schiff LLP

(57) ABSTRACT

A system may be configured to implement a probability network for loss prevention sensors. In some aspects, the system may determine a location transition of a tag associated with an article, determine a first predictive value based at least in part on a first predictive structure and the location transition, the first predictive structure corresponding to a valid detection alarm, and determine a second predictive value based at least in part on a second predictive structure and the location transition, the second predictive structure corresponding to an invalid detection alarm. Further, the system may generate a notification based at least in on part on comparing the first predictive value to the second predictive value, the notification indicating unauthorized movement of the tag outside of a geographic area.

20 Claims, 4 Drawing Sheets

METHOD AND SYSTEM FOR PROBABILISTIC NETWORK BASED LOSS PREVENTION SENSORS

CROSS-REFERENCE TO RELATED APPLICATION

This application claims priority to U.S. Application No. 63/089,949, entitled

"PROBABILISTIC NETWORK FOR LOSS PREVENTION SENSOR," filed on Oct. 9, 2020, the disclosure of which is incorporated by reference herein in its entirety.

BACKGROUND

The present disclosure relates generally to security systems, and more particularly, to systems and methods for implementing a probability network for loss prevention sensors.

Many loss prevention systems rely on radio frequency identifier (RFID) tags to detect unauthorized activity (i.e., article theft). In particular, many loss prevention system employ received signal strength indicator ("RSSI") information and phase angle information of RFID tag reads to identify unauthorized activity. These approaches are often inaccurate and/or struggle to produce timely alerts. For example, many loss prevention systems are rendered inaccurate by stray tag reads resulting from reflected RFID tags. Moreover, the inability to provide accurate results may lead to a loss prevention system being ignored altogether, cause significant customer inconvenience, and/or drive significant financial loss.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for implementing a probability network for loss prevention sensors.

In an aspect, a method for implementing a probability network for loss prevention sensors, comprises determining a location transition of a tag associated with an article, determining a first predictive value based at least in part on a first predictive structure and the location transition, the first predictive structure corresponding to a valid detection alarm, determining a second predictive value based at least in part on a second predictive structure and the location transition, the second predictive structure corresponding to an invalid detection alarm, and generating a notification based at least in on part on comparing the first predictive value to the second predictive value, the notification indicating unauthorized movement of the tag outside of a geographic area.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Electronic article surveillance ("EAS") systems are commonly used in retail stores and other settings to prevent the unauthorized removal of articles (e.g., merchandise) from a protected area. Typically, a security system is used at an exit of the protected area. The security system may generate an electromagnetic field across the exit, known as an interrogation zone. Protected merchandise are tagged with an EAS marker (or electronic tag) that, when activated by the electromagnetic field in the interrogation field, generates an electromagnetic response signal that can trigger an alarm.

Further, security system inaccuracy may drive economic loss or customer dissatisfaction. For example, in a retail loss prevention context, a security system may incorrectly trigger an alarm and embarrass a customer which could potentially expose the retailer to legal action. In some implementations, one problem solved by the present solution is one of accurately and timely identifying unauthorized activity via an electronic tag. For example, this present disclosure describes systems and methods for implementing a probability network for loss prevention sensors.

Figure 1:
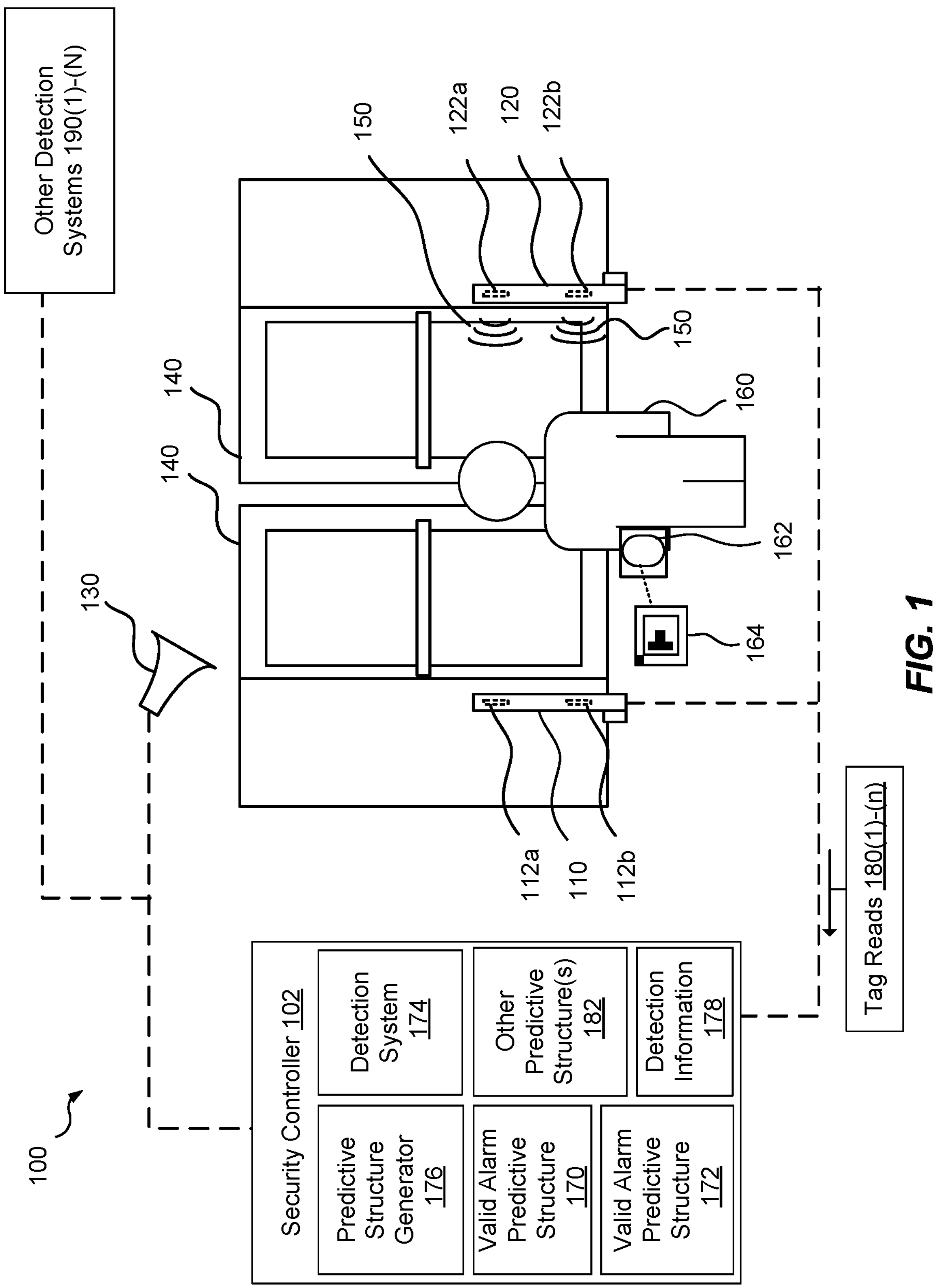
FIG. 1 is a diagram of an example security system, according to aspects of the present disclosure.

Referring to FIG. 1, an example security system 100 deployed at an establishment (e.g., store) is depicted. The security system 100 may include a security controller 102 configured to control the plurality of components and subsystems of the security system 100.

The security system 100 may also include a plurality of pedestals 110 and 120 communicatively coupled with the security controller 102. While the examples provided herein describe the security system 100 using pedestals 110 and 120, one skilled in the art would recognized that other structures (e.g., walls, posts, etc.), movable or fixed, may be used to implement the systems and methods described herein. In an aspect, the plurality of pedestals 110 and 120 are positioned near the exit doors 140 of the establishment. The pedestals 110 and 120 may be spaced from each other to form an interrogation zone (e.g., area formed between the plurality of pedestals 110 and 120) that an individual 160 passes through before exiting through the exit doors 140 of the establishment. Each of the pedestals 110 and 120 may include a plurality of antennas 112*a*, 112*b*, 122*a*, and 122*b* (or coils) for generating interrogation signals 150 (e.g., electromagnetic fields) to detect an electronic tag 164 on merchandise 162 carried by the individual 160 through the interrogation zone. Examples of the electronic tag 164 include, but are not limited to, a radio frequency identifier (RFID) tag, an acousto-magnetic tag, or any other type of EAS devices on the merchandise 162. Further, the RIFD components may produce signals with one or more attributes detectable by the pedestals 110 and 120. For instance, the electronic tag may passively produce a resonant signal in response to an interrogation signal received from the pedestals 110 and 120. Further, the resonant signal may have a particular frequency that falls within an operating frequency range of the pedestals 110 and 120.

In some aspects, the pedestals 110 and 120 may be configured to coordinate the creation of sessions, fields, and/or zones. In particular, the pedestals 110 and 120 may be configured to cycle through upper and lower antennae, inside and outside beams on each antennae, high power session reads for "FAR" detection of electronic tags (e.g., the electronic tag 164), and lower power session reads for "NEAR" detection of electronic tags (e.g., the electronic tag 164). As an example, the pedestals 110 and 120 may be configured to create four overlapping fields by adjusting the power at which the various antennae read electronic tags (e.g., the electronic tag 164).

The security system 100 may also include an alarm device 130 communicatively coupled with the security controller 102 and configured to generate alarm information to alert personnel, such as employees of the retail store, police officers, security guards, or any other person, to the unauthorized removal of the merchandise 162. For example, the alarm device 130 may generate alert information in response to receiving an alarm signal from the security controller 102. Examples of the alarm device 130 may include one or more of an audio alarm device (e.g., horn), a visual alarm device (e.g., light), a computing device (e.g., personal computer, laptop, mobile device) that receives messages such as text or email (or any form of communication), or any other device capable of alerting personnel of the unauthorized removal of the merchandise 162. In an example, the alarm device 130 may be located at the same location (e.g., retail store) as the pedestals 110 and 120 and/or may be located remote to the location.

As illustrated in FIG. 1, the security controller 102 may include the valid alarm predictive structure 170, the invalid alarm predictive structure 172, the detection system 174, the predictive structure generator 176, and the detection information 178. In some aspects, the valid alarm predictive structure 170 and the invalid alarm predictive structure 172 may be data structures including probability values for a plurality of state transitions of electronic tags (e.g., the electronic tag 164) detectable by the pedestals 110 and 120. As used herein, in some aspect, a "state" of an electronic tag may refer to an attribute of an electronic tag read. Some examples of state include an antenna that performed an electronic tag read, a gate associated with an electronic tag read, a port associated with an electronic tag read, a beam associated with an electronic tag read, a session associated with an electronic tag read, a field associated with an electronic tag read, a zone associated with an electronic tag read, and/or any other tag read attribute associated with the location, movement, or direction of the electronic tag 164. In some aspects, the valid alarm predictive structure 170 and the invalid alarm predictive structure 172 may be a state transition probability matrix of a Markov probability network, a Bayesian probability network, a probability graphical model, a probability matrix, etc. Further, the probability values of the valid alarm predictive structure 170 may indicate the likelihood (e.g., a likelihood ratio) that the particular state transition corresponds to unauthorized movement of the electronic tag 164 (i.e., corresponds to a state transition associated with a valid alarm notification by the alarm device 130), while the probability values of the invalid alarm predictive structure 172 may indicate the likelihood that the particular state transition corresponds to stray reads of the electronic tag 164 (i.e., corresponds to a state transition associated with invalid alarm notification by the alarm device 130). Further, the valid alarm predictive structure 170 and the invalid alarm predictive structure 172 may be of an order greater than one. For instance, the probability values of the valid alarm predictive structure 170 may indicate the likelihood that the next state transition following a sequence of state transitions corresponds to unauthorized movement of the electronic tag 164, while the probability values of the invalid alarm predictive structure 172 may indicate the likelihood that next state transition following a sequence of state transitions corresponds to stray reads of the electronic tag 164 (i.e., corresponds to a state transition associated with invalid alarm notification by the alarm device 130).

For example, the valid alarm predictive structure 170 may include the likelihood that an electronic tag (e.g., the electronic tag 164) transitions from being detected by a first beam of the pedestals 110 and 120 to being detected by a second beam of the pedestals 110 and 120 in a sequence of beam transitions corresponding to unauthorized movement of an electronic tag 164. As another example, the valid alarm predictive structure 170 may include the likelihood that a tag transitioning from being at a first location to being at a second location belongs to a sequence of location transitions corresponding to unauthorized movement of an electronic tag. In some aspects, the valid alarm predictive structure 170 may be a second order predictive structure. As such, the valid alarm predictive structure 170 may include the likelihood that an electronic tag 164 that has transitioned from being detected by a first beam to being detected by a second beam will transition to being detected by a third beam in a sequence of beam transitions corresponding to unauthorized movement of an electronic tag 164.

For example, the invalid alarm predictive structure 172 may include the likelihood an electronic tag (e.g., the electronic tag 164) transitions from being detected by a first beam of the pedestals 110 and 120 to being detected by a second beam of the pedestals 110 and 120 in a sequence of beam transitions corresponding to a sequence of stray reads and/or an invalid alarm notification. As another example, the invalid alarm predictive structure 172 may include the likelihood that a tag transitioning from being at a first location to being at a second location belongs to a sequence of location transitions corresponding to a sequence of stray reads and/or an invalid alarm notification. In some aspects, the invalid alarm predictive structure 172 may be a second order predictive structure. As such, the invalid alarm predictive structure 172 may include the likelihood that an electronic tag 164 that has transitioned from being detected by a first beam to being detected by a second beam will transition to being detected by a third beam in a sequence of beam transitions corresponding to a sequence of stray reads and/or an invalid alarm notification.

Further, the detection system 174 may be configured to determine whether to generate an alarm notification at the alarm device 130 based on a plurality of tag reads 180 received from the pedestals 110 and 120. In some aspects, the detection system 174 may determine a time-ordered sequence of tag reads within a period of time for a specific electronic tag 164 from the plurality of tag reads 180 and/or the detection information 178. Further, the detection system 174 may extract a detection attribute from each tag read in the sequence of tag reads to determine a time-ordered sequence of the extracted detection attributes. For example, the detection system 174 may extract a beam identifier identifying the beam that detected the electronic tag during the respective tag read. In addition, the detection system 174 may determine a first predictive value based on the time-ordered sequence of extracted detection attributes and the valid alarm predictive structure 170, and a second predictive value based on the time-ordered sequence of detection attributes and the invalid alarm predictive structure 172. Additionally, the detection system 174 may compare the first predictive value and the second predictive value. In some aspects, the detection system 174 may trigger an alarm notification at the alarm device 130 when the first predictive value satisfies a comparison or does not satisfy a comparison. For example, the detection system 174 may trigger an alarm notification at the alarm device 130 when the first predictive value is greater than the second predictive value. In some other examples, the detection system 174 may trigger an alarm notification at the alarm device 130 when the first predictive value is greater than the second predictive value by a predefined threshold. In yet still some other aspects, the detection system 174 may trigger an alarm notification at the alarm device 130 when the first predictive value is greater than the second predictive value and the first predictive value has a predictive confidence above a predefined threshold.

Further, in some aspects, the detection system 174 may determine a first likelihood of a state transition from a first value of a tag read attribute to a second value of the tag read attribute from the valid alarm predictive structure 170, and a second likelihood of a state transition from the second value of the tag read attribute to a third value of the tag read attribute from the valid alarm predictive structure 170. Further, the detection system 174 may determine the likelihood of the sequence from the first value to the second value to the third value corresponding to unauthorized movement of an electronic tag based upon combining (e.g., multiplying) the first likelihood and the second likelihood. Further, in some aspects, the detection system 174 may determine a first likelihood of a state transition from a first value of a tag read attribute to a second value of the tag read attribute from the invalid alarm predictive structure 172, and a second likelihood of a state transition from the second value of the tag read attribute to a third value of the tag read attribute from the invalid alarm predictive structure 172. Further, the detection system 174 may determine the likelihood of the sequence from the first value to the second value to the third value corresponding to a sequence of stray tag reads based upon combining (e.g., multiplying) the first likelihood and the second likelihood.

Further, in some aspects, the detection system 174 may be further configured to determine a behavior of the individual or a location of the tag with respect to the individual 160 based on the valid alarm predictive structure 170. For example, the valid alarm predictive structure 170 or a derivative predictive structure of the valid alarm predictive structure 170 may indicate the likelihood that the time-ordered sequence of detection attributes is indicative of a particular type of behavior or a particular location of an electronic tag with respect to an individual. Some examples of behavior include placing the electronic tag above one's head, a fast-paced walk, slow-paced walk, using a body part to shield the electronic tag, passing an article attached to the electronic tag in front of the detection system, placing an article attached to the electronic tag underneath one's arm, placing an article attached to the tag within a container, a near pedestal theft, and/or using one or more individuals to shield a shopper in possession of an article attached to the electronic tag. Some examples of a location of an electronic tag include a front pocket, back pocket, etc.

Further, in some aspects, the security controller 102 may receive the valid alarm predictive structure 170 and the invalid alarm predictive structure 172 from a server or centralized entity. Additionally, or alternatively, the predictive structure generator 176 may generate and/or update the valid alarm predictive structure 170 and the invalid alarm predictive structure 172. For instance, the predictive structure generator 176 may generate or update the valid alarm predictive structure 170 and the invalid alarm predictive structure 172 based on the detection information 178. As an example, the detection information 178 may include training data for training a predictive structure. During a setup phase, the training data may be generated by capturing interactions between the pedestals 110 and 120 and one or more electronic tags (e.g., the electronic tags 164). In some implementations, the interactions may be simulated in a testing environment or captured after initial installation of the pedestals 110 and 120 in a real-world environment. The training data may include location sequence information, e.g., a plurality of tag read sequences corresponding to valid alarms and a plurality of stray tag read sequences corresponding to invalid alarms. Further, individual tag reads within the sequences may include for example but not limited hereto, one or any combination of an identifier of the tag, a date and time of the interaction, an identifier of the tag monitoring device, an identifier of the corresponding article, antenna information, gate information, a port identifier, a beam identifier, a session identifier, a target identifier, a field identifier, a zone identifier, direction (e.g., ingoing or outgoing), an activity type (e.g., tag above one's head, a fast-paced walk, slow-paced walk, using a body part to shield the electronic tag, passing an article associated with the tag in front of the detection system, placing an article attached to the tag underneath one's arm, placing an article attached to the tag within a container, a near pedestal theft, and/or using one or more individuals to shield a shopper in possession of an article attached to the electronic tag), a channel number, transmission power, frequency, a phase angle, or a received signal strength indicator ("RSSI") value.

In addition, in some aspects, the detection system 174 may be configured to trigger an alarm notification by the alarm device 130 based on the likelihood information, as described herein, in combination with a predictive output produced by an ensemble machine learning method. For example, the detection system 174 may further include one or more other predictive structures 182 configured to provide a predictive output that identifies unauthorized tag movements. In some aspects, the other predictive structure 182 may be a random forest classifier and/or another machine learning decision tree structure. For instance, the other predictive structure 182 may be a random forest classifier generated using the training data of the detection information 178. Further, the random forest classifier may be an encoded representation of one or more state transition probability matrices, and the random forest classifier output (i.e., the predictive output) may be a function of the path from a root node to a leaf of a tree of the random forest classifier. As an example, the path from a root node to a tree leaf of a random forest classifier may encode a sequence of tag reads (e.g., the sequence of tag reads 180(1)-(N)). In addition, the detection system 174 may be configured to generate an alarm notification based on combining a first predictive output (i.e., likelihood information) generated by the valid alarm predictive structure 170 and the invalid alarm predictive structure 172 and a second predictive output generated by the random forest classifier. For example, the detection system 174 may generate an alarm notification when the likelihood information for a sequence of tag reads indicates that a first predictive value generated by the valid alarm predictive structure 170 is greater than a second predictive value produced by the invalid alarm predictive structure 172, and the predictive output of the one or more other predictive structures 182 indicates that it is more likely than not that the sequence of tag reads 180 correspond to unauthorized tag movement. In some aspects, the detection system 174 may apply weights to the first predictive output and the second predictive output when determining whether to generate an alarm notification based on the valid alarm predictive structure 170, the invalid alarm predictive structure 172, and the one or more other predictive structures 182.

Further, as illustrated in FIG. 1, the system 100 may include one or more other detection systems 190(1)-(N) (e.g., a motion detector, facial recognition systems, etc.) for indicating whether an electronic tag read corresponds to authorized movement out of the establishment. Further, in some aspects, the detection system 174 may be configured to trigger an alarm notification by the alarm device 130 based at least in part on the likelihood information determined using the valid alarm predictive structure 170 and/or the invalid alarm predictive structure 172, and a detection result of at least one of the detection systems 190(1)-(N). Additionally, in some others aspects, the security controller 102 may determine a detection result based on an RSSI or phase angle of a tag read, and the detection system 174 may be configured to trigger an alarm notification by the alarm device 130 based at least in part on the likelihood information determined using the valid alarm predictive structure 170 and/or the invalid alarm predictive structure 172, and a detection result determined from the RSSI or phase angle of a tag read 180(1). As used herein, in some aspects, a "detection result" may refer to a value indicating whether user activity corresponds unauthorized movement.

As illustrated in FIG. 1, the individual 160 may carry the merchandise having an electronic tag 164, and walk through the interrogation zone created by the pedestals 110 and 120. As the individual 160 walks through the interrogation zone, a sequence of tag reads 180(1)-(N) may be created based upon the interactions between the electronic tag 164 and the pedestals 110 and 120, the pedestals 110 and 120 may transmit the sequence of tag reads 180(1)-(N) to the security controller 102, and the security controller 102 may store the sequence of tag reads 180(1)-(N) within the detection information 178. Further, as described in detail herein, the detection system 174 may determine the likelihood that at least a portion of the sequence of tag reads 180(1)-(N) is consistent with unauthorized movement through the interrogation zone, and trigger an alarm notification by the alarm device 130 based on the determined likelihood. Although FIG. 1 illustrates a single pedestal pair (i.e., the pedestals 110 and 120), a single individual, and single merchandise 162 with an electronic tag 164 attached thereto, the system 100 may include any number of pedestal pairs and any number of merchandise 162 items with electronic tags 164 attached thereto. Further, any number of individuals may occupy the area where the security system is deployed.

Figure 2:
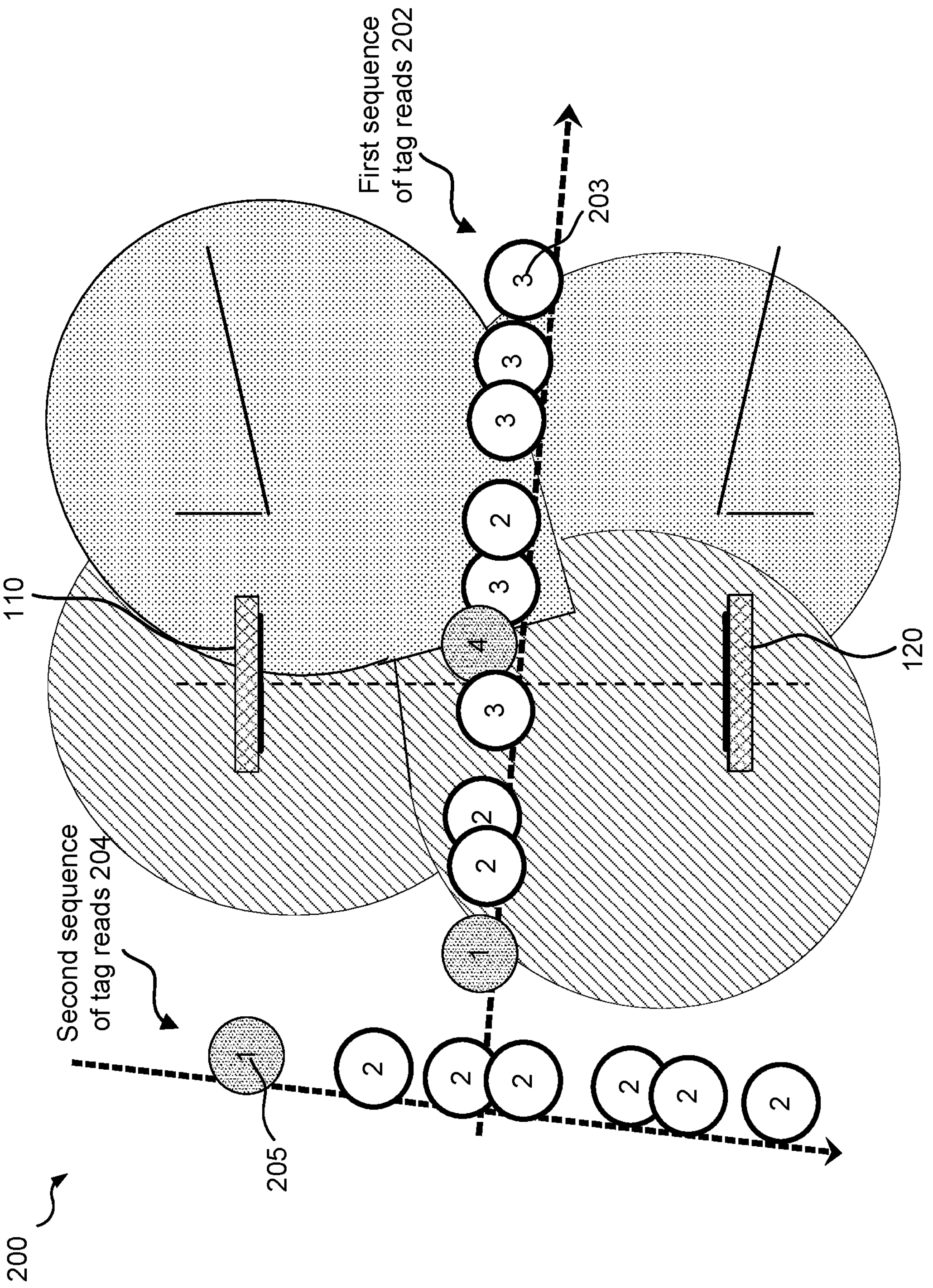
FIG. 2 is diagram of examples of sequences of tag reads within an example security system, according to aspects of the present disclosure.

Referring to FIG. 2, examples 200 of sequences of tag reads within the security system 100 are depicted. As illustrated in FIG. 2, in some examples, as the individual 160 walks through the pedestals, a first sequence of tag reads 202 is generated by the pedestals 110 and 120. Further, each individual tag read of the first sequence of tag reads is associated with a detection attribute (e.g., beam identifier 203). As described in detail herein, the detection system 174 may employ the detection attributes of the first sequence of tag reads 202 to determine if the first sequence of tag reads 202 corresponds to unauthorized movement of the merchandise 162 and the electronic tag 164. Further, as illustrated in FIG. 2, in some examples, as the individual 160 walks near the pedestals 110 and 120, a second sequence of tag reads 204 is generated by the pedestals 110 and 120. In some instances, some of tag reads of the second sequence of tag reads 204 may be stray tag reads caused by reflections, blockages, and other conditions. In addition, each individual tag read of the second sequence of tag reads is associated with a detection attribute (e.g., beam identifier 205). As described in detail herein, the detection system 174 may employ the detection attributes of the second sequence of tag reads 204 to determine if the sequence of tag reads 204 corresponds to unauthorized movement of the merchandise 162 and the electronic tag 164. For example, the detection system 174 may determine that the first sequence of tag reads 202 corresponds to unauthorized movement and trigger an alarm notification by the alarm device 130, and determine that the second sequence of tag reads 204 does not correspond to unauthorized movement.

Figure 3:
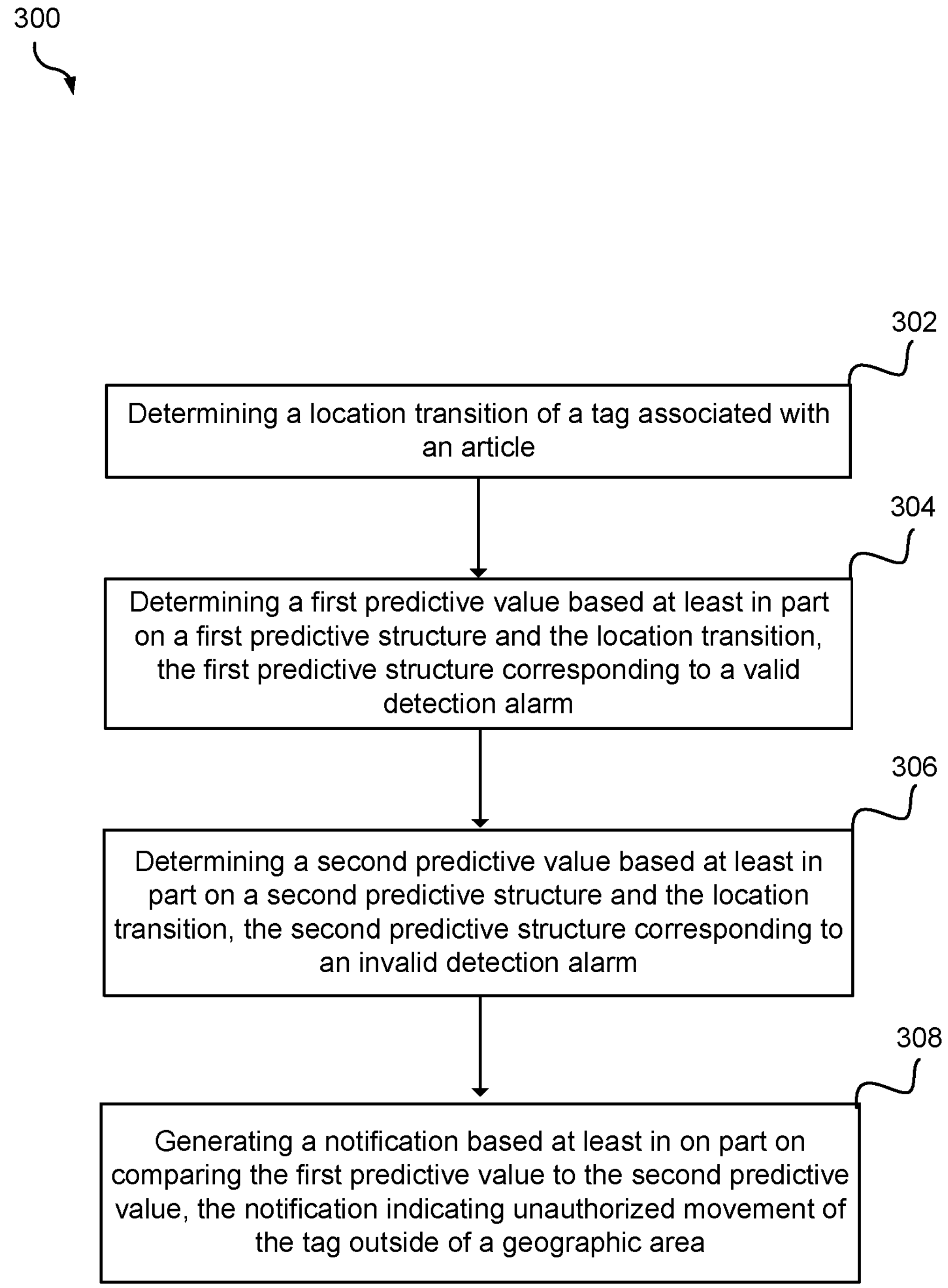
FIG. 3 is a flow diagram of an example of a method of implementing a probability network for loss prevention sensors, according to aspects of the present disclosure.

Referring to FIG. 3, in operation, the security system may perform an example method 300 for of implementing a probability network for loss prevention sensors. The method 300 may be performed by one or more components of the security controller 102 or any device/component described herein according to the techniques described with reference to FIG. 1.

At block 302, the method 300 includes determining a location transition of a tag associated with an article. For example, the detection system 174 may determine that the electronic tag 164 has transitioned from being detected by a first beam to being detected by a second beam of the pedestals 110 and 120. Accordingly, the security system 100 and/or the security controller 102 executing the detection system 174 may provide means for determining that the electronic tag 164 has transitioned from being detected by a first beam to being detected by a second beam of the pedestals 110 and 120.

At block 304, the method 300 includes determining a first predictive value based at least in part on a first predictive structure and the location transition, the first predictive structure corresponding to a valid detection alarm. Further, the detection system 174 may determine the likelihood that the transition from the first beam to the second beam corresponds to unauthorized movement of the electronic tag 164 based on the valid alarm predictive structure 170. Accordingly, the security system 100 and/or the security controller 102 executing the detection system 174 may provide means for determining a first predictive value based at least in part on a first predictive structure and the location transition, the first predictive structure corresponding to a valid detection alarm.

At block 306, the method 300 includes determining a second predictive value based at least in part on a second predictive structure and the location transition, the second predictive structure corresponding to an invalid detection alarm. Further, the detection system 174 may determine the likelihood that transition from the first beam to the second beam corresponds to one or more stray tag reads of the electronic tag 164 based on the invalid alarm predictive structure 172. Accordingly, the security system 100 and/or the security controller 102 executing the detection system 174 may provide means for determining a second predictive value based at least in part on a second predictive structure and the location transition, the second predictive structure corresponding to an invalid detection alarm.

At block 308, the method 300 includes generating a notification based at least in on part on comparing the first predictive value to the second predictive value, the notification indicating unauthorized movement of the tag outside of a geographic area. For example, the detection system 174 may trigger an alarm notification by the alarm device 130 based at least in part on the likelihood value determined using the valid alarm predictive structure 170 being greater than the likelihood value determined using the invalid alarm predictive structure 172. In some other examples, the detection system may not trigger an alarm notification by the alarm device 130 based at least in part on the likelihood value determined using the valid alarm predictive structure 170 being less than or equal to the likelihood value determined using the invalid alarm predictive structure 172.

In some examples, the detection system 174 may trigger an alarm notification by the alarm device 130 based at least in part on the first likelihood value determined using the valid alarm predictive structure 170 being greater than the second likelihood value determined using the invalid alarm predictive structure 172, and a decision result generated by the one or more other predictive structures 182. For example, the detection system 174 may trigger an alarm notification by the alarm device 130 based at least in part on the first likelihood being greater than the second likelihood value, and a decision result determined by the one or more other predictive structures indicating that it is more likely than not that the transition from the first beam to the second beam corresponds to unauthorized movement of the electronic tag 164.

Accordingly, the security system 100 and/or the security controller 102 executing the detection system 174 may provide means for generating a notification based at least in on part on comparing the first predictive value to the second predictive value, the notification indicating unauthorized movement of the tag outside of a geographic area.

Figure 4:
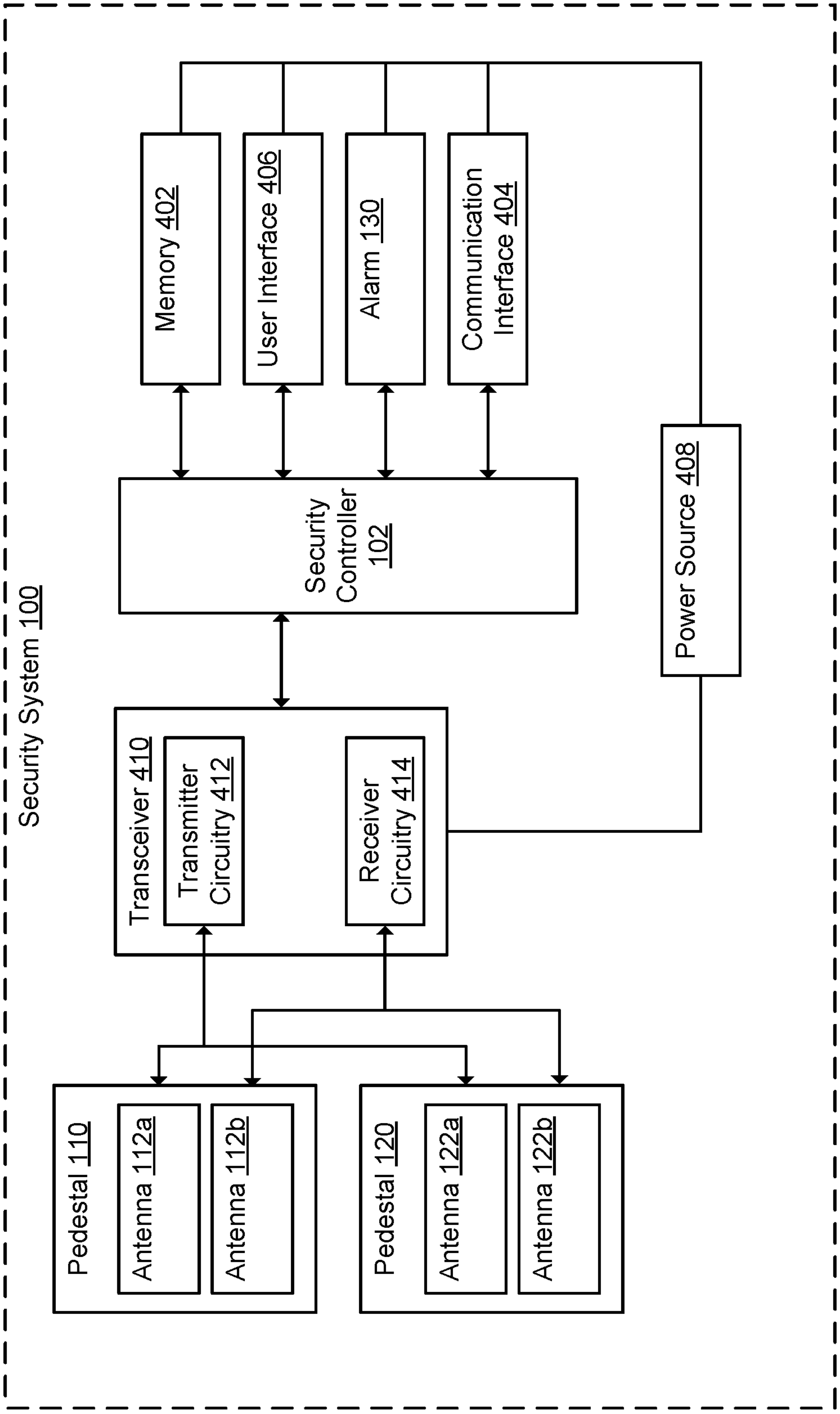
FIG. 4 is a block diagram of the example security system of FIG. 1 including various hardware components and other features, according to aspects of the present disclosure.

Referring to FIG. 4, an exemplary security system 100 to implement all or a portion of the functionality described in FIGS. 1-4. For example, the security system 100 may be or may include any components described herein with reference to FIGS. 1-4. The security system 100 may include the security controller 102 which may be configured to execute or implement software, hardware, and/or firmware modules that perform some or all of the functionality described herein with reference to FIGS. 1-4.

The security controller 102 may be one or more processors, micro-controllers, application-specific integrated circuits (ASICs), or field-programmable gate array (FPGAs), and/or may include a single or multiple set of processors or multi-core processors. Moreover, the security controller 102 may be implemented as an integrated processing system and/or a distributed processing system.

The security system 100 may further include a memory 402 (or computer-readable medium including non-transitory medium), such as for storing local versions of applications and media being executed by the security controller 102, related instructions, parameters, etc. The memory 402 may include a type of memory usable by a computer, such as random access memory (RAM), read only memory (ROM), tapes, magnetic discs, optical discs, volatile memory, non-volatile memory, removable storage devices (e.g., program cartridge and cartridge interface or a removable memory chip), and any combination thereof. Additionally, the security controller 102 and the memory 402 may include and execute an operating system executing on the security controller 102, one or more applications, display drivers, etc., and/or other components of the security system 100.

Further, the security system 100 may include a communications interface 404 that provides for establishing and maintaining communications with one or more other devices, parties, entities, etc. utilizing hardware, software, and services. The communications interface 404 may carry communications between components of the security system 100, as well as between the security system 100 and external devices, such as devices located across a communications network and/or devices serially or locally connected to the security system 100. In an aspect, for example, the communications interface 404 may include one or more buses, and may further include transmit chain components and receive chain components associated with a wireless or wired transmitter and receiver, respectively, operable for interfacing with external devices.

The security system 100 may also include a user interface 406 operable to receive inputs from a user of the security system 100 and further operable to generate outputs for presentation to the user (e.g., via a display interface to a display device). The security system 100 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the security system 100 may include one or more output devices, including but not limited to the alarm device 130, a display interface, a speaker, a haptic feedback mechanism, a printer, any other mechanism capable of presenting an output to a user, or any combination thereof.

The security system 100 may also include a power source 408, such as a battery or AC power, that supplies electricity to components of the security system 100. In an example, power source 408 may include one or more power sources such that any of the components of the security system 100 may be individually powered.

The security system 100 may also include a transceiver 410 for transmitting and receiving signals (e.g., interrogation signals 150). In an example, the transceiver 410 may include transmitter circuitry 412 electrically coupled to the antennas 112*a*, 112*b*, 122*a*, and 122*b*, and receiver circuitry 414 electrically coupled to the antennas 112*a*, 112*b*, 122*a*, and 122*b*. In an example, the transmitter circuitry 412 may transmit radio frequency signals (e.g., interrogation signal 150) and the receiver circuitry 414 may receive the radio frequency signals (e.g., interrogation signal 150) based on control signals from the security controller 102.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A security system comprising:

a memory storing computer-executable instructions; and at least one processor coupled with the memory and configured to execute the computer-executable instructions to:

determine, by a detection system, a location transition of a tag associated with an article;

determine, by the detection system, a first predictive value based at least in part on a first predictive structure and the location transition, the first predictive structure corresponding to a valid detection alarm;

determine, by the detection system, a second predictive value based at least in part on a second predictive structure and the location transition, the second predictive structure corresponding to an invalid detection alarm; and generate a notification based at least in on part on comparing the first predictive value to the second predictive value, the notification indicating unauthorized movement of the tag outside of a geographic area.

2. The security system of claim 1, wherein to determine the location transition of the tag associated with the article, the at least one processor is further configured to:

capture a first detection of the tag by a first antenna beam;

capture a second detection of the tag by a second antenna beam; and generate the location transition to indicate transition of a tag state from the first detection by the first antenna beam to the second detection by the second antenna beam.

3. The security system of claim 1, wherein to determine whether to generate the notification, the at least one processor is further configured to:

generate the notification based at least in part on the first predictive value being greater than the second predictive value.

4. The security system of claim 1, wherein the location transition is a first location transition, the notification is a first notification, and the at least one processor is further configured to:

determine a second location transition of the tag;

determine a third predictive value based at least in part on the first predictive structure and the second location transition;

determine a fourth predictive value based at least in part on the second predictive structure and the second location transition;

combine the first predictive value and the third predictive value to determine a validity prediction;

combine the second predictive value and the fourth predictive value to determine an invalidity prediction; and determine whether to generate a second notification based at least in on part on comparing the validity prediction to the invalidity prediction, the second notification indicating unauthorized movement of the tag outside of the geographic area.

5. The security system of claim 1, wherein the at least one processor is further configured to:

generate the first predictive structure based on training data including location sequence information for a plurality of valid detection alarms, the location sequence information for an individual valid detection alarm including a sequence of tag reads corresponding to the individual valid detection alarm.

6. The security system of claim 1, wherein the at least one processor is further configured to:

generate the second predictive structure based on training data including location sequence information for a plurality of invalid detection alarms, the location sequence information for an individual invalid detection alarm including a sequence of stray tag reads corresponding to the individual invalid detection alarm.

7. The security system of claim 1, wherein the at least one processor is further configured to:

identify a plurality of valid detection alarms; and update the first predictive structure based at least in part on location sequence information corresponding to the plurality of valid detection alarms.

8. The security system of claim 1, wherein the at least one processor is further configured to:

determine a predicted behavior based at least in part on the first predictive structure and the location transition.

9. The security system of claim 1, wherein the at least one processor is further configured to:

determine a predicted location of the article associated with the tag based at least in part on the first predictive structure and the location transition.

10. A method, comprising:

determining, by a detection system, a location transition of a tag associated with an article;

determining, by the detection system, a first predictive value based at least in part on a first predictive structure and the location transition, the first predictive structure corresponding to a valid detection alarm;

determining, by the detection system, a second predictive value based at least in part on a second predictive structure and the location transition, the second predictive structure corresponding to an invalid detection alarm; and generating a notification based at least in on part on comparing the first predictive value to the second predictive value, the notification indicating unauthorized movement of the tag outside of a geographic area.

11. The method of claim 10, wherein determining the location transition of the tag associated with the article comprises:

capturing a first detection of the tag by a first antenna beam;

capturing a second detection of the tag by a second antenna beam; and generating the location transition to indicate transition of a tag state from the first detection by the first antenna beam to the second detection by the second antenna beam.

12. The method of claim 10, wherein generating the notification comprises generating the notification based at least in part on the first predictive value being greater than the second predictive value.

13. The method of claim 10, wherein the location transition is a first location transition, the notification is a first notification, and further comprising:

determining a second location transition of the tag;

determining a third predictive value based at least in part on the first predictive structure and the second location transition;

determining a fourth predictive value based at least in part on the second predictive structure and the second location transition;

combining the first predictive value and the third predictive value to determine a validity prediction;

combining the second predictive value and the fourth predictive value to determine an invalidity prediction; and generating a second notification based at least in on part on comparing the validity prediction to the invalidity prediction, the second notification indicating unauthorized movement of the tag outside of the geographic area.

14. The method of claim 10, further comprising:

generating the first predictive structure based on training data including location sequence information for a plurality of valid detection alarms, the location sequence information for an individual valid detection alarm including a sequence of tag reads corresponding to the individual valid detection alarm.

15. The method of claim 10, further comprising:

generating the second predictive structure based on training data including location sequence information for a plurality of invalid detection alarms, the location sequence information for an individual invalid detection alarm including a sequence of stray tag reads corresponding to the individual invalid detection alarm.

16. The method of claim 10, further comprising:

identifying a plurality of valid detection alarms; and updating the first predictive structure based at least in part on location sequence information corresponding to the plurality of valid detection alarms.

17. The method of claim 10, further comprising determining a predicted behavior based at least in part on the first predictive structure and the location transition.

18. A non-transitory computer-readable device having instructions stored thereon that, when executed by at least one computing device, cause the at least one computing device to perform operations comprising:

determining, by a detection system, a location transition of a tag associated with an article;

determining, by the detection system, a first predictive value based at least in part on a first predictive structure and the location transition, the first predictive structure corresponding to a valid detection alarm;

determining, by the detection system, a second predictive value based at least in part on a second predictive structure and the location transition, the second predictive structure corresponding to an invalid detection alarm; and generating a notification based at least in on part on comparing the first predictive value to the second predictive value, the notification indicating unauthorized movement of the tag outside of a geographic area.

19. The non-transitory computer-readable device of claim 18, wherein determining the location transition of the tag associated with the article comprises:

capturing a first detection of the tag by a first antenna beam;

capturing a second detection of the tag by a second antenna beam; and generating the location transition to indicate transition of a tag state from the first detection by the first antenna beam to the second detection by the second antenna beam.

20. The non-transitory computer-readable device of claim 18, wherein generating the notification comprises:

determining, by a random forest classifier, a predictive output indicating that the location transition of the tag corresponds to unauthorized tag movement; and generating the notification based on the first predictive value being greater than the second predictive value and the predictive output.

* * * * *